Sept. 22, 1970　　　　　G. MATTE　　　　　3,529,494

REVERSE GEARING ASSEMBLY

Filed Dec. 18, 1968　　　　　　　　　　　　3 Sheets-Sheet 1

INVENTOR
Gaston MATTE

ATTORNEY

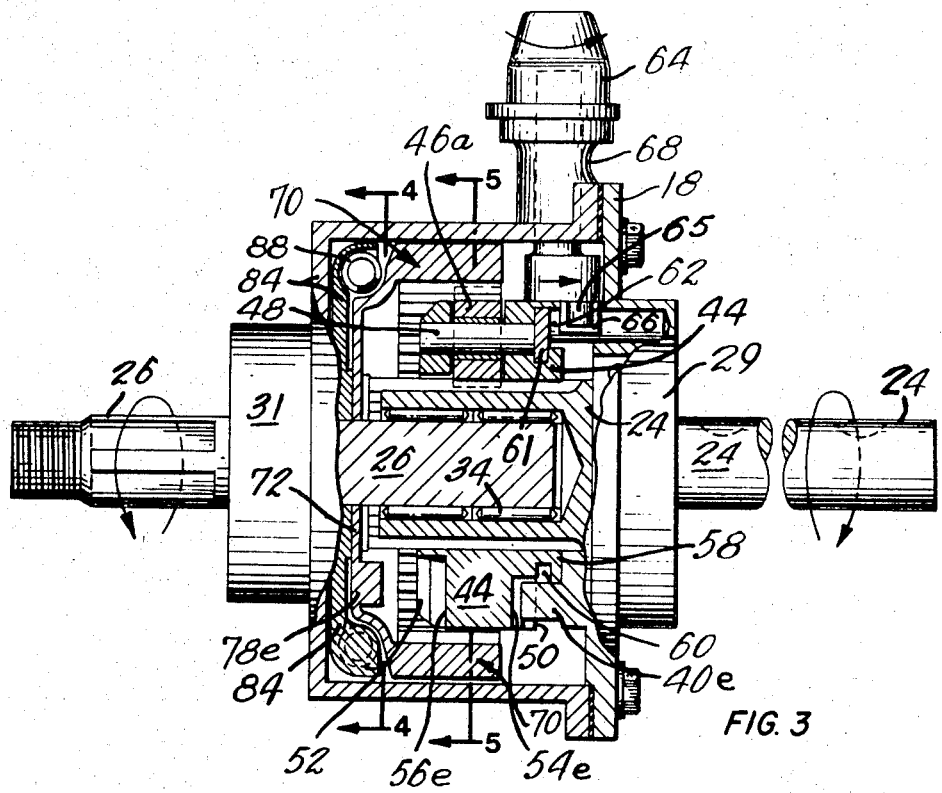
FIG. 3
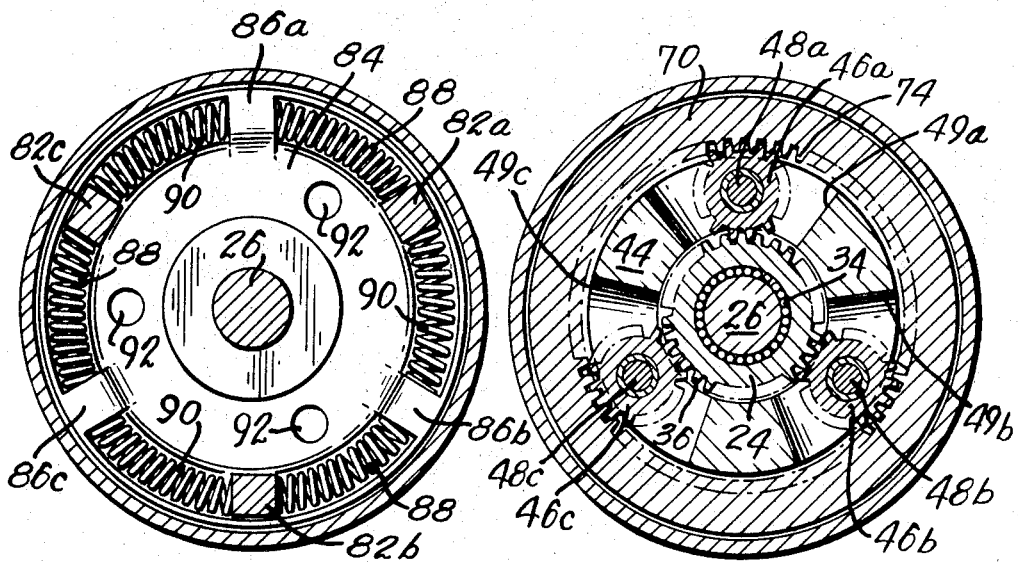
FIG. 4
FIG. 5
INVENTOR
Gaston MATTE
*Alan Swabey*
ATTORNEY Sept. 22, 1970    G. MATTE    3,529,494
REVERSE GEARING ASSEMBLY
Filed Dec. 18, 1968    3 Sheets-Sheet 3

INVENTOR
Gaston MATTE

Alan Swabey
ATTORNEY

United States Patent Office 3,529,494
Patented Sept. 22, 1970

3,529,494
REVERSE GEARING ASSEMBLY
Gaston Matte, B.P. 462, La Tugue, Quebec, Canada
Filed Dec. 18, 1968, Ser. No. 784,823
Int. Cl. F16h *3/44, 37/10*
U.S. Cl. 74—792                                     6 Claims

ABSTRACT OF THE DISCLOSURE

A reverse gearing assembly in which is provided a planetary gear system cooperating with a ring gear. The ring gear includes driving lugs cooperating with a drive plate and shock-absorbing springs provided between the driving lugs of the ring gear and the cooperating shoulders on the drive plate.

BACKGROUND OF INVENTION

Field of invention

The present invention relates to a reverse gearing assembly and particularly to a reverse gearing suitable for use on miniature vehicles such as motorized snow sleds, etc.

Description of prior art

Heretofore, reverse gearing assemblies have not been commonly used in such miniature vehicles since most reverse gearing assemblies known to date are relatively expensive. It has been found that rather than disburse the additional cost for optional conventional reverse gearing systems, the operators would prefer reversing their vehicles by hand.

It is evident that for manufacturers of the now popular motorized snow sleds to provide a reverse gearing on their sleds, such sleds would have to be marketed at prices in competition with the sleds which do not incorporate this added feature. In order to provide this feature on such vehicles, a reverse gearing assembly had to be found which would be relatively inexpensive, simple in construction, and above all, highly resistant to abusive use.

SUMMARY OF INVENTION

It is an aim of the present invention to provide a reverse gearing assembly which would meet the above requirements.

A construction in accordance with the present invention comprises an input shaft and a coaxial output shaft, and gear train means between said input and output shaft. Means are provided for reversing said gear train means, while a radial hub member having a gear means is adapted to cooperate with said gear train means, a drive plate fixed to said output shaft and adjacent the radial hub of said gear. The radial hub is provided with at least one abutment lug extending axially towards said drive plate and located between a pair of circumferentially spaced-apart abutment shoulders mounted on said drive plate and resilient shock absorbing means are provided between said abutment lug and each of said abutment shoulders.

In a more specific construction of the invention, there is provided an input shaft and a coaxial output shaft, planetary gear means concentric with the sun gear integral with said input shaft, and an internal peripheral gear cooperating with said planetary gear means. Transfer means are provided for alternatively moving said planetary gear means into operating engagement between said sun gear and said peripheral internal gear thereby effecting reverse rotation to said peripheral gear relative to said sun gear, and alternatively to move said planetary gears out of direct engagement whereby the peripheral gear is linked to said sun gear for unitary movement therewith. The peripheral gear includes a radial hub. A drive plate is fixed to said output shaft and adjacent the radial hub of said internal gear. The hub has at least one abutment lug extending axially towards said drive plate and located between a pair of circumferentially spaced-apart abutment shoulders mounted on the drive plate and resilient shock-absorbing means are provided between said abutment lug and each of said abutment shoulders.

BRIEF DESCRIPTION OF THE DRAWINGS

Having thus generally described the nature of the invention, it will now be referred to in more detail by reference to the accompanying drawings illustrating a preferred embodiment of the invention, and in which:

FIG. 3 is an axial cross section similar to FIG. 2 wherein the output shaft is shown in position to rotate a reverse direction to the input shaft;

FIG. 4 is a vertical cross section taken along the lines 4—4 of FIG. 3;

FIG. 5 is a vertical cross section taken along the lines 5—5 of FIG. 3;

DESCRIPTION OF PREFERRED EMBODIMENT

Figure 1:
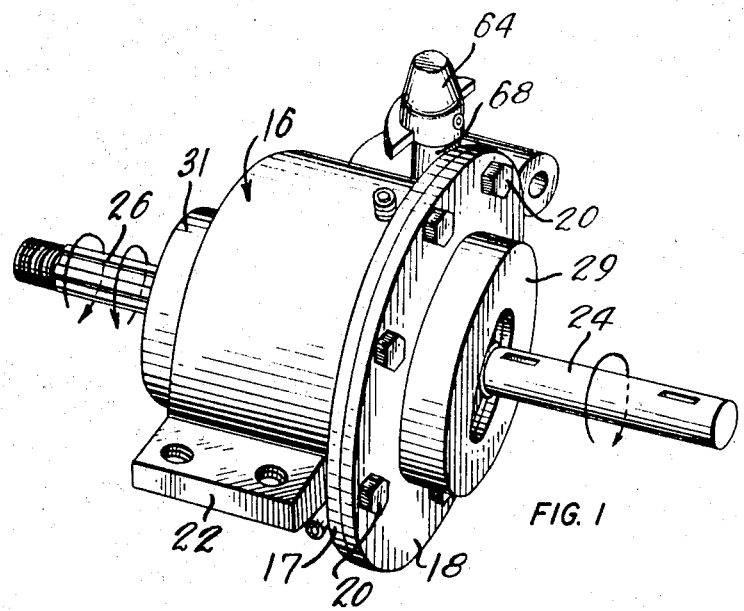
FIG. 1 is a perspective view of the reverse gearing assembly in its compact housing.

An embodiment of the reverse gearing assembly as shown in FIGS. 1 to 10 includes a housing 16 and a housing cover 18 fastened to the flange 17 of the housing 16 by means of bolts 20. Mounting flanges 22 are also provided on the housing 16. An input shaft 24 extends within the housing 16 on the side of the cover 18 while an output shaft 26 extends, coaxially of the input shaft, on the opposite side of the housing 16. The input shaft 24 is seated in bearings 28 in the bearing cage 29 provided in the cover 18. Similarly, the output shaft 26 is journalled in a pair of bearings 30 in the bearing cage 31 projecting from the housing 16.

The input shaft 24 enlarged at its end includes an axial recess 32 in which are mounted needle bearings 34. The recess 32 and needle bearings 34 are provided to receive the end of the output shaft 26 and allowed to rotate independently of the input shaft with the exception of the gear train which will be described hereinafter.

The outer surface of the enlarged end of the input shaft 24 is provided with external splines 36.

Figure 8:
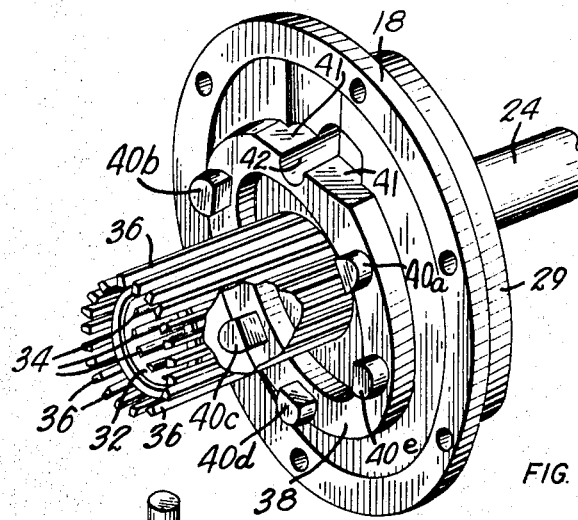
FIG. 8 is a perspective view of still a further element of the gearing.
Figure 9:
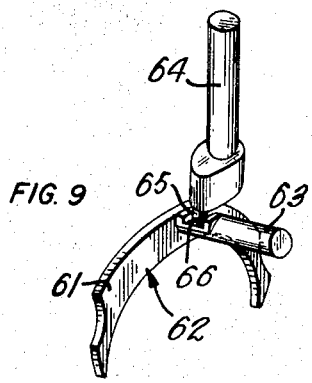
FIG. 9 is a perspective view of yet a further element of the gearing.

Reference is now made to FIG. 8 which shows a perspective view of the cover 18 and the enlarged end of shaft 24. An annular member 38 is shown projecting from the interior surface of the cover 18 and mounts a plurality of spaced-apart projecting lugs 40a–40d. The top of the annular member 38 has been leveled off to present shoulders 41 on either side of the recess 42. The lugs 40a–40d as well as the recess 42 will be described in more detail hereinafter.

A planetary gear carriage 44 is located about the enlarged end of the input shaft 24 and is concentric therewith. The planetary gear carriage 44 can be clearly seen in FIGS. 5 and 7, as well as in sectional views 2, 3, and 10. Three planetary gears 46a–46c are freely mounted on stub shafts 48a–48c with radial openings 49a–49c. The stub shafts 48a–48c are of course journalled in the carriage 44.

The carriage 44 includes two radial wall surfaces 50 and 52. Recesses 54a–54d are provided in the wall surface 50 and are adapted to receive corresponding lugs 40a–40d provided in the annular member 38 of the cover 18.

Similarly, recesses 56a–56d are provided on the opposite wall surface 52 as will be explained later in more detail.

The planetary gear carriage 44 is also provided with a projecting hub member 58 which defines an annular groove 60. A transfer follower 62 includes a curved member 61 adapted to be seated loosely in the groove 60 of the hub 58. The transfer follower 62 is provided with a recess 66 in the spindle 63 in which a lug 65 of an eccentric transfer member 64 is adapted to engage. The eccentrice transfer member 64 is journalled in the housing mounting 68 and upon actuation causes the transfer follower 62 to move the planetary gear carriage 44 to and fro in an axial direction.

The ring gear 70 has interior gear teeth 74 adapted to engage the teeth of the planetary gear members 46 and includes a cylindrical wall portion 76 on which the gear teeth 74 are mounted and a radial hub plate 72. Projecting lugs 78a–78e are provided in the hub plate 72 of the ring gear 70 which are adapted to engage in corresponding recesses 56a–56e of the planetary gear carriage 44.

As described above, the transfer member 64 and the transfer follower 62 move the carriage 44 to and fro in an axial direction. More specifically, the follower 62 moves the carriage 44 axially so that the teeth of the planetary gear members 46 slide axially in the splines 36 and the gear teeth 74 of the ring gears 70 from a position wherein the lugs 40 engage the recesses 54 as shown in FIG. 3 and wherein the lugs 78 are free of the recesses 56, to a position where the lugs 78 engage the recesses 56 but the lugs 40 are free of the recesses 54.

On the opposite side of the hub plate 72 of ring gear 70 are three abutment lugs 82a–82c. These lugs will be described in more detail hereinafter particularly in connection with FIG. 4. Also apertures 80 are provided in the ring gear to allow lubricating fluid to pass from one side of the ring gear 70 to the other side.

Immediately adjacent the ring gear 70 but fixed to the output shaft 26 is a drive plate 84. Drive plate 84 as shown in FIG. 4 includes three abutment shoulders 86a–86c. Abutment shoulders 86a are so located on the drive plate 84 that the lugs 82 are normally located circumferentially spaced therefrom with one lug 82 between two abutment shoulders 86. Pairs of springs 88 and 90 are located one on each side of lug 82 between pairs of shoulders 86 as shown.

As can be seen, the ring gear 70 if caused to move in either rotational direction relative to the drive plate 84, the abutment lugs 82 will move to either of the adjacent abutment shoulders 86 such as lug 82a in a direction towards shoulder 86a or shoulder 86b. Such movement will be dampened by the compression of the spring 88 or 90 inbetween these shoulders 86 thus reducing the shock of the lug 82 abutting suddenly against either shoulder 86a or 86b.

Lubrication apertures 92 are provided in the drive plate 84 to allow lubrication to pass from one side of the drive plate 84 to the other.

Figure 2:
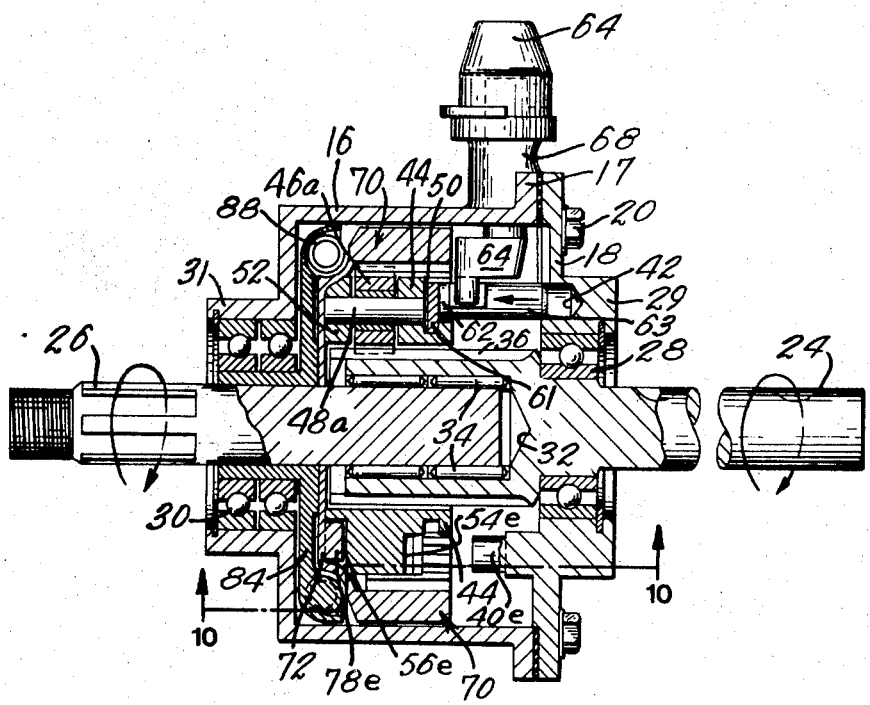
FIG. 2 is an axial cross section taken through a reverse gear assembly shown in FIG. 1 in a position such that the output shaft will rotate in the same direction as the input shaft.
Figure 6:
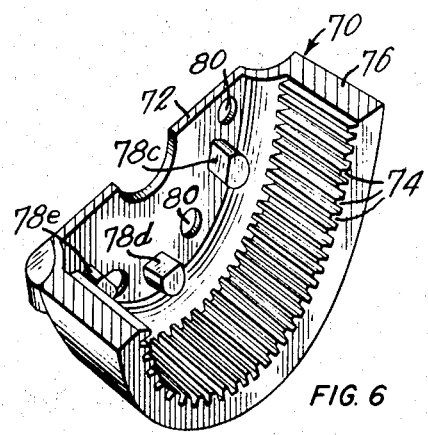
FIG. 6 is a fragmentary perspective view of an element of the gearing shown in the above figures.
Figure 7:
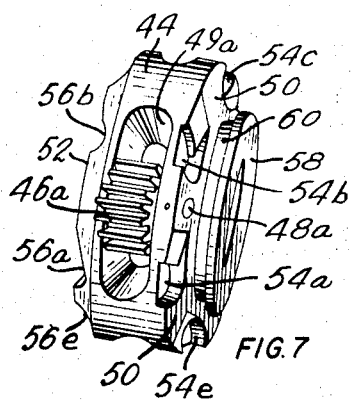
FIG. 7 is a perspective view of further detail of the gearing.
Figure 10:
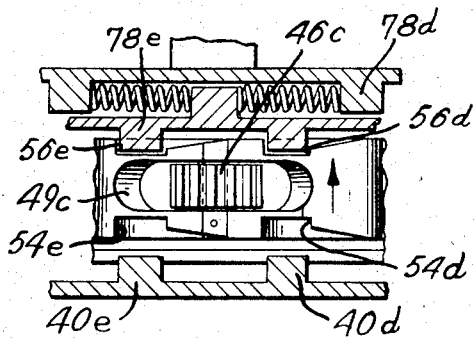
FIG. 10 is a fragmentary cross-sectional view taken generally along lines 10—10 (for purpose of location) of FIG. 2.

In operation, the drive shaft 24 can be integral with or connected to a suitable drive member such as the drive shaft of a motorized sled. The transfer members 64 can be turned to either of two positions. In one position, such as shown in FIG. 2, the gearing assembly will be in a forward position, that is the output shaft 26 will rotate in the same direction as the input shaft 24. In this case, the carriage 44 has been forced axially by the transfer follower 62 into a position such as shown in FIG. 2 where the lugs 78 engage corresponding recesses 56 such as shown in FIGS. 2 and 10.

In this case, as a torsional force is applied to the input shaft 24, the spline end of the shaft 36 which engages the teeth of the planetary gears 46 will cause the carriage 44 and the ring gear 70 to rotate in unison since the carriage 44 and the ring gear 70 are locked as an integral member by the action of the lugs 78 and the recesses 56. In this case, the torsional force is transferred from the ring carriage 44 through lugs 78 through the hub plate 72, the abutment lugs 82 which in turn compress the springs 90 to abut the shoulders 86 of the drive plate 84. The drive plate 84 which is fixed to the output shaft 26 causes the shaft 26 to rotate in unison with the shaft 24. The above gear train could also include reducing gear members which would cause the shaft 26 to rotate at a slower velocity than the shaft 24.

If the transfer member 64 is rotated to the second position which is the reverse position as shown in FIG. 3, then the follower 62 will move the carriage 44 into a position such that the lugs 40 will engage the recesses 54 of the ring carriage 44. In this case, the ring carriage 44 is not engaged with the hub 72 of the ring gear 70. The torsion supplied by the input shaft 24 to the planetary gears 46 will not be transmitted to the carriage 44 since the carriage 44 is now locked with the housing cover 18 by means of the lugs 40. Rather, the planetary gears 46 will rotate transmitting the torsional forces to the teeth 74 of the ring gear 70 causing the ring gear 70 to rotate in a direction opposite to the input shaft 24.

Now the lugs 82 will be caused to rotate in an opposite direction compressing the springs 88 towards the opposite shoulders 86 and transfer the torsional force to the shoulder 86 and in turn to the drive plate 84 thus giving the output shaft 26 a direction reverse to the direction of the input shaft 24.

I claim:

1. A reverse gear assembly comprising an input shaft and a coaxial output shaft, gear train means connected to said input shaft, a rotating hub member having a gear means adapted to cooperate with said gear train means, means for selectively reversing the direction of said hub member, a drive plate fixed to said output shaft and adjacent the hub member, said hub and said drive plate including cooperating abutment means adapted for limited relative movement, resilient shock-absorbing means provided between said abutment means on said drive plate and said hub member.

2. A reverse gear assembly comprising an input shaft and a coaxial output shaft, gear train means connected to said input shaft, a rotating hub member having a gear means adapted to cooperate with said gear train means, means for selectively reversing said direction of said hub member, a drive plate fixed to said output shaft and adjacent the hub member, at least one abutment lug on said hub and located between a pair of circumferentially spaced-apart abutment shoulders on said drive plate and resilient shock-absorbing means provided between said abutment lug and each of said abutment shoulders.

3. A reverse gear assembly comprising an input shaft and a coaxial output shaft, a planetary gear means concentric with a sun gear integral with said input shaft, an internal peripheral gear cooperating with said planetary means, transfer means for alternately moving said planetary gear means into operating engagement between said sun gear and said peripheral internal gear thereby affecting reverse rotation of said peripheral gear relative to said sun gear, and alternately to move said planetary gear out of direct engagement whereby the peripheral gear is linked to said sun gear for unitary movement therewith, said peripheral gear including a radial hub, drive plate fixed to said output shaft and adjacent the radial hub of said internal gear, the hub having at least one abutment lug extending axially towards said drive plate and located between a pair of circumferentially spaced-apart abutment shoulders mounted on said drive plate and resilient shock-absorbing means provided between said abutment lug and each of said abutment shoulders.

4. A reverse gear assembly as defined in claim 1 wherein there are three spaced-apart abutment lugs on the radial hub member extending axially towards the drive plate and located between three circumferentially spaced abutment shoulders so that one abutment lug is located between two abutment shoulders and a coil spring member is located between each adjacent abutment lug and abutment shoulder.

5. A reverse gear assembly as defined in claim 2 wherein the planetary gear means includes a plurality of planetary gears carried by a planetary gear carriage; said transfer means includes a transfer follower adapted to engage the planetary gear carriage and move it axially whereby the planetary gears will slide in said sun gear and said internal gearing.

6. A reverse gear assembly as defined in claim 5, wherein locking means are provided on the hub member adapted for engagement with the planetary gear carriage and locking means are provided on the housing adapted for engagement with said gear carriage and wherein said transfer means includes means for sliding said gear carriage into locking engagement with said hub member or alternatively into locking engagement with said housing member.

References Cited
UNITED STATES PATENTS

| | | | |
|---|---|---|---|
| 1,161,463 | 11/1915 | Ehlin | 74—792 |
| 1,333,176 | 3/1920 | Johnson | 74—788 |
| 1,397,111 | 11/1921 | Petrelli | 74—792 |
| 1,918,775 | 7/1933 | Nabstedt | 74/792 |
| 2,115,987 | 5/1938 | Dodge et al. | 74—788X |
| 2,463,265 | 3/1949 | Graves | 74—792 |

ARTHUR T. McKEON, Primary Examiner

U.S. Cl. X.R.

74—792